Feb. 9, 1932.                    G. JOBST                  1,843,981

LIGHT CONTROL MEANS

Filed Aug. 5, 1927

DISTRIBUTION OF LIGHT ABOUT A DIFFUSELY DISPERSING SUBSTANCE

INVENTOR
GÜNTHER JOBST
BY Ira J. Adams
ATTORNEY

Patented Feb. 9, 1932

1,843,981

UNITED STATES PATENT OFFICE

GÜNTHER JOBST, OF BERLIN, GERMANY, ASSIGNOR TO GESELLSCHAFT FUR DRAHTLOSE TELEGRAPHIE M. B. H., OF BERLIN, GERMANY, A CORPORATION OF GERMANY

LIGHT CONTROL MEANS

Application filed August 5, 1927, Serial No. 210,992, and in Germany August 6, 1926.

The present invention relates to an arrangement adapted for the control of light, which may be particularly useful for the purposes of wireless picture transmission, television, high-speed telegraphy or the recording of electric oscillations and the like.

The light-control means according to the disclosure of the present invention is based upon the physical effect of diffuse light dispersion which arises whenever the light passes through a transparent medium containing a body of an almost equal index of refraction, and if by some external influence or another the refractive index of the medium or of the transparent body, or both, is altered inside the region where the indices of refraction are almost identical. For in this particular region, there occurs a very abrupt change in the intensity of the light that has passed or of the light diffusely dispersed at the boundary surface of the body located in said medium. The utilization of the said effect for the purpose of light control for practical work constitutes the subject-matter of the invention. For further explanation the basic physical process shall be described hereinafter in more detail. For further facts reference may be had to an article in Annalen der Physik, fourth series, vol. 78, 1925, p. 157, where the diffuse radiation of dielectric spheres is investigated and where it is found that, in the limiting case, the material of the spheres and the ambient medium have nearly equal indices of refraction. It must be noted that if a non-planar transparent body is exposed to parallel light, then the distribution of the light scattered by it, as long as the index of refraction of its material differs from that of its surroundings, depends upon the shape of the body and on all sides, as will become apparent from a consideration of the accompanying drawings, wherein:

Figure 1:
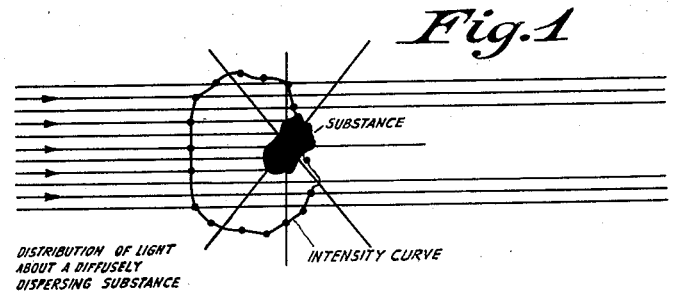
Fig. 1 illustrates the distribution of light from a non-planar body having an index of refraction differing materially from that of its surroundings.
Figure 2:
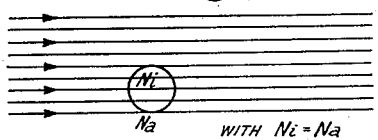
Fig. 2 illustrates a distribution of light where the light is passed through a body having an index of refraction equal to that of its surroundings.
Figure 3:
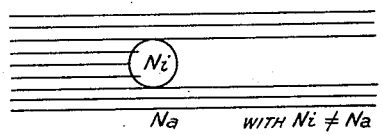
Fig. 3 illustrates the light passage where the index of refraction of the two bodies differs.

The distribution is dependent upon the relationship between wave-length and dimensions of body and also upon the values of the refractive indices of the body material and the surrounding medium. If both indices are alike, then the distribution of the light will resemble the picture or sketch shown in Fig. 2; upon a screen which is placed in the rear of the body at right angles to the light rays, the intensity is uniformly distributed since, optically speaking, the body no longer exists. In the case of Fig. 1, the distribution upon such a screen would look as shown in Fig. 3, in other words, since the body absorbs nearly all of the incident light by diffuse reflection and refraction, it forms a shadow. The distribution upon the screen may not be markedly altered by alteration of the refractive indexes as long as the latter are still widely discrepant compared with each other. It is only in the presence of nearly complete equality, upon approaching or equalization of the refractive indices, that sudden changes in the intensity upon the screen in the rear of the sphere will occur. The intensity does not entirely change abruptly, equalization of unsteadiness taking place by a diffraction effect.

Figure 4:
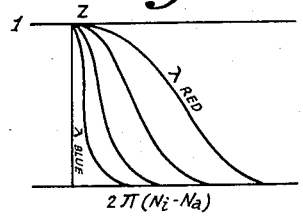
Fig. 4 illustrates the intensity of the light as shown graphically as a function of $$2\pi a(N_i-N_a);$$
Figure 5:
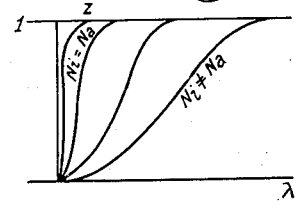
Fig. 5 shows graphically the intensity as a function of the wave length of the incident light.

In case the diffusely dispersing body is a glass sphere in a solution possessing nearly the same refractive index as the ball, then the intensity law for passing light, in first approximation is:

$$Z = \rho - \frac{(2\pi a)^2}{\lambda}(Na - Ni)^2$$

if the share of intensity per unit of area of the ball is $=1$, and if $a$ the diameter of the ball, $\lambda$ the wave-length of incident light, $Z$ the intensity per unit of area of the screen, $Na$ the index of refraction of the outer material, $Ni$ the index of refraction of the material and $\rho$ is a constant whose value depends upon the intensity of the light source and the transparency of the light valve. Then from the dependence of intensity $Z$ upon the wave-length it is possible to tell at once that a diffraction phenomenon is concerned. In Figs. 4 and 5, intensity $Z$ is shown graphically in one case as a function of $2\pi a(Ni - Na)$ and in the other case as a function of $\lambda$.

The formula $$Z = \rho - \left(\frac{2\pi a}{\lambda}\right)^2 (Ni - Na)^2$$

is only a first approximation and is only valid as long as $Z < 1$. It will be seen therefrom that the change of $Z$ responds very strongly to alterations of the refractive index; when the ball has a diameter of about 1 cm. and if the light of a sodium flame is used, we get:

$$\frac{dZ}{d(Ni - Na)^2}$$

of the order of $= 2 \times 10^{10}$. The intensity upon the screen is very largely dependent upon changes in the refractive index.

Figure 6:
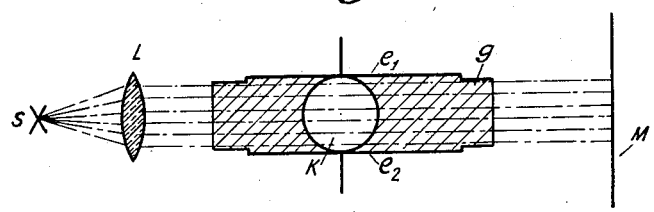
Fig. 6 shows a preferred form of the light valve in accordance with my invention.
Figure 7:
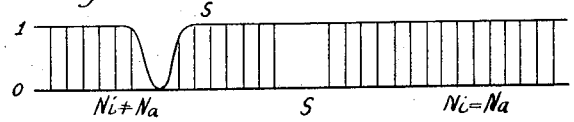
Fig. 7 shows graphically the intensity of light upon a screen for the conditions shown by Figs. 2 and 3, wherein the left-hand portion of Fig. 7 illustrates the condition where $N_i \neq N_a$, and the right-hand portion shows the condition where $N_i = N_a$; and, Fig. 8 diagrammatically and conventionally illustrates a modification of my invention.
Figure 8:
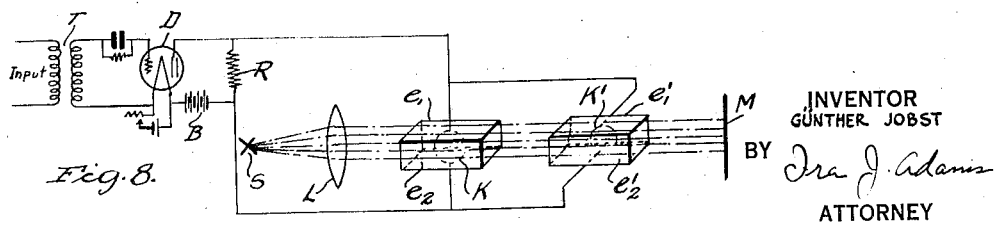

If the difference in refractive indices or else the wave-length of the penetrating light is influenced by external agencies of an electrical, magnetic, mechanical, thermal or chemical nature, this makes it possible to vary the intensity of the light falling upon the screen. As stated, this effect inside the boundary region where the indices of refraction are equal to each other, is of extremely great sensitiveness. For instance, if we take into consideration the case of electric control (for it is this case that plays the most important part in the practice of picture transmission and television), the arrangement of light-control relays (light valves) can be chosen in the following manner according to this invention (Fig. 6):

Suppose a vessel G is filled with a liquid and that inside the vessel there is a transparent ball K whose refractive index is approximately the same as the refractive index of the liquid that is employed. Suppose the ball and the liquid are disposed between two electrodes E1 and E2 to which the electrical potentials are supplied. The light from a luminous source S is made parallel by optical means, such as a lens L, so that the rays pass through between the electrode plates and fall upon the screen M. Now, according to the invention, the material of the transparent sphere is so selected, and such a substance is chosen for the liquid, that their refractive indices are nearly the same. Then the control potential is supplied to the electrodes, and the variations in intensity can be observed upon the screen. The arrangement can be so chosen that, when uninfluenced, there is brightness while darkening is produced under the influence of potentials. Of course, the control scheme could also be reversed; in other words, there may be normal darkness while brightness is produced by action of the potential. One advantage of the arrangement as hereinbefore disclosed over known light control schemes is that it is possible to operate with unpolarized light, so that all such losses as are occasioned in the polarizer and the analyzer, are dispensed with and avoided. To be sure, there is a selective action for one direction of polarization for the alteration of the refractive index by the electric field, so that, under certain circumstances, it may seem more suitable to use a polarizer. But it may also be possible to dispose two light valve arrangements in series, according to the spirit of the present invention, as shown by Fig. 8, and to influence the two by means of fields at right angles to, or crossing, each other. Then the luminous variations which are polarized at right angles to the first field, will be preferentially influenced by the second field. And in this case an analyzer can be omitted. The sensitivity of the arrangement may be still further enhanced by that several transparent bodies are disposed in a row inside the liquid. Most suitable is an arrangement in which the liquid consists of nitrobenzol and the transparent body of a glass sphere of almost identical indices of refraction. As regards the potentials that are to be applied, it may be a good plan in the case of various liquids whose insulation powers are not ideal, to protect the equipment against the chances of wrong polarity for this often is conducive to breakdown. For this purpose, rectified A. C. potentials are preferably used for the control, that is, for instance, in the manner that the potential is taken off across the terminals of a resistance R which is inserted in the plate circuit of an amplifying rectifier D, the alternating potentials in this scheme being fed to the grid of the tube through transformer T or equivalent connected with an appropriate input circuit. It is also possible to use a biasing potential and to superpose the control potential upon the latter. The use of a biasing potential is recommendable also for the reason to insure proportional light control with favorable and high sensitivity. It goes without saying that as to detail, the constructions may be quite different and diversified.

In addition to what has been stated above, it may be further mentioned that the body of different nature which is employed in the light permeable medium need not necessarily be a body of a chemically or physically different nature; indeed for so far as the optical effect is concerned it is entirely sufficient if part of the transparent medium, by some convenient external influences, is kept under other physical conditions than the ambient, in other words, a certain part of a transparent liquid, for instance, may be exposed to the action of a concentrated electrical or magnetic field, with the result that this particular part will then possess, optically speaking, different properties than the part of the medium uninfluenced by such field, and it will thus act as a body possessing a different nature. Hence, the glass sphere can be replaced by a bounded or separated region of the nitrobenzol which is subject to electrical potentials.

Having thus described my invention I claim:

1. A light control system comprising, a light source, a transparent medium in the path of the light rays issuing from said source, a transparent body having at least one surface crossing the optical axis in other than a plane normal thereto arranged within said medium and contiguous therewith, said body having different chemical and physical properties from said medium and an index of refraction approximately the same as said medium, and means for applying an electric field to said contained body for producing internal refraction within said system so as to abruptly change the intensity of the penetrating light in accordance with the application of said electric field.

2. A light control system comprising, a light source, a transparent medium in the path of the rays issuing from said source, a body having at least one optically effective surface crossing the optical axis in other than the plane normal thereto and having a similar index of refraction to said medium contained within said medium, said body having different chemical and physical properties from said medium, a light sensitive material in the path of the light rays penetrating said medium, and means for applying a potential to said body for producing abrupt changes in the intensity of said penetrating light.

3. A light valve comprising two contiguous bodies normally having like indices of refraction, one of said bodies being arranged along the optical axis of said light valve and having at least one surface crossing the optical axis in other than a plane normal thereto and adapted to change its index of refraction on the application of an electric field and the surface of contiguity being so shaped that internal refraction will occur on the application of such field.

4. A light valve comprising a container filled with a solution of nitrobenzol and a spherical body contained therein and having an index of refraction substantially equal to the index of refraction of said nitrobenzol under normal conditions, and means for applying an electric field to said nitrobenzol and said body whereby the index of refraction of said body is changed an internal refraction occurs within the system so as to control the emitted light in accordance with the electric field applied.

5. A light control system comprising a light source, a transparent medium in the path of the light rays issuing from said source, a transparent body having at least one surface crossing the optical axis in other than a plane normal thereto arranged inside said medium and contiguous therewith, said body and medium having substantially equal indices of refraction under normal conditions, and means for applying an external force on said light control system for producing a change in the value of said indices of refraction relative to each other for producing variations in the intensity of the penetrating light.

GÜNTHER JOBST.